(12) United States Patent
Galensky et al.

(10) Patent No.: US 6,845,398 B1
(45) Date of Patent: Jan. 18, 2005

(54) WIRELESS MULTIMEDIA PLAYER

(75) Inventors: Duane Galensky, Eatontown, NJ (US); Andrew Zidel, Westfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/366,351

(22) Filed: Aug. 2, 1999

(51) Int. Cl.[7] ............................................. G06F 13/00
(52) U.S. Cl. ..................... 709/231; 709/203; 709/217; 709/219
(58) Field of Search ................................ 709/200, 201, 709/203, 217, 218, 219, 216, 225, 226, 227, 228, 229, 230, 231, 232, 236

(56) References Cited

U.S. PATENT DOCUMENTS

| | | | | |
|---|---|---|---|---|
| 4,685,133 A | | 8/1987 | Iggulden | 381/3 |
| 5,262,875 A | * | 11/1993 | Mincer et al. | |
| 5,557,541 A | * | 9/1996 | Schulhof et al. | |
| 5,596,420 A | * | 1/1997 | Daum | |
| 5,684,716 A | * | 11/1997 | Freeman | |
| 5,694,334 A | * | 12/1997 | Donahue et al. | |
| 5,694,455 A | | 12/1997 | Goodman | 455/413 |
| 5,698,802 A | * | 12/1997 | Kamiya | |
| 5,721,956 A | * | 2/1998 | Martin et al. | |
| 5,732,216 A | * | 3/1998 | Logan et al. | 709/203 |
| 5,734,119 A | * | 3/1998 | France et al. | |
| 5,752,032 A | | 5/1998 | Keller et al. | 709/311 |
| 5,758,293 A | * | 5/1998 | Frasier | |
| 5,764,961 A | * | 6/1998 | Bhat | |
| 5,768,527 A | | 6/1998 | Zhu et al. | 709/231 |
| 5,784,649 A | | 7/1998 | Begur et al. | 710/52 |
| 5,797,043 A | | 8/1998 | Lewis et al. | 710/56 |
| 5,815,634 A | * | 9/1998 | Daum et al. | |
| 5,822,524 A | * | 10/1998 | Chen et al. | |
| 5,822,537 A | * | 10/1998 | Katseff et al. | |
| 5,822,553 A | | 10/1998 | Gifford et al. | 710/305 |
| 5,831,664 A | * | 11/1998 | Wharton et al. | |
| 5,841,979 A | * | 11/1998 | Schulhof et al. | |
| 5,848,422 A | * | 12/1998 | Sato et al. | |
| 5,862,235 A | | 1/1999 | Kowalczyk | 381/79 |
| 5,870,710 A | | 2/1999 | Ozawa et al. | 704/500 |
| 5,886,276 A | * | 3/1999 | Levine et al. | |
| 5,914,941 A | * | 6/1999 | Janky | |
| 5,926,624 A | * | 7/1999 | Katz et al. | |
| 5,930,493 A | * | 7/1999 | Ottesen et al. | |
| 5,957,985 A | * | 9/1999 | Wong et al. | |
| 5,986,692 A | * | 11/1999 | Logan et al. | |
| 6,055,566 A | | 4/2000 | Kikinis | |
| 6,061,802 A | | 5/2000 | Gulick | |
| 6,064,379 A | * | 5/2000 | DeMoney | |
| 6,072,521 A | * | 6/2000 | Harrison et al. | |
| 6,081,843 A | * | 6/2000 | Kilkki et al. | 709/232 |
| 6,138,221 A | * | 10/2000 | Korst et al. | |
| 6,151,634 A | * | 11/2000 | Glaser et al. | |
| 6,175,822 B1 | * | 1/2001 | Jones | |

(List continued on next page.)

Primary Examiner—Moustafa M. Meky

(57) ABSTRACT

A wireless device, system and method for receiving and playing multimedia files streamed from a multimedia server over a wireless telecommunications network. A desired multimedia file is selected from one or more multimedia files stored in the multimedia server, which server is operatively connected to the wireless telecommunications network. Successive blocks of data from the desired multimedia file are streamed over the wireless telecommunications network in a digitized and compressed format and received by the wireless telecommunications device. The received blocks of data from the streamed multimedia file are temporarily stored in a buffer in the wireless device, decoded and decompressed, and successively played through an audio and/or video output in the wireless device. The wireless device monitors the blocks of data stored in the buffer and signals the wireless telecommunications network to increase the rate that the data blocks are transmitted over the wireless network in the event that the data stored in the buffer falls below a minimum threshold level.

69 Claims, 1 Drawing Sheet

U.S. PATENT DOCUMENTS

| | | | |
|---|---|---|---|
| 6,199,076 B1 * | 3/2001 | Logan et al. ............ | 715/501.1 |
| 6,208,804 B1 * | 3/2001 | Ottesen et al. | |
| 6,275,896 B1 * | 8/2001 | Kojima | |
| 6,292,834 B1 * | 9/2001 | Ravi et al. ................. | 709/233 |
| 6,300,880 B1 * | 10/2001 | Sitnik | |
| 6,460,076 B1 * | 10/2002 | Srinivasan ................. | 709/219 |
| 6,487,663 B1 * | 11/2002 | Jaisimha et al. | |
| 6,502,194 B1 * | 12/2002 | Berman et al. | |

* cited by examiner

WIRELESS MULTIMEDIA PLAYER

BACKGROUND OF THE INVENTION

1. Field of the Invention

The present invention relates generally to the field of multimedia communications and, more particularly, to a method and device for streaming and/or storing high quality, real time multimedia information over a wireless telecommunications network.

2. Description of the Related Art

In recent years, the availability of multimedia information (e.g., audio, video, data, etc.) to consumers has grown tremendously. Currently, with the popularity of the Internet, high quality, digital multimedia information can readily be obtained by a user of a personal computer hard wired to a multimedia server over the Internet.

One common example is the transmission and downloading of digital audio data files (e.g., music) from a multimedia server connected to a user's computer over the Internet. The user is able to select desired audio files from a list of such files stored in or otherwise accessible by the multimedia server. To ensure high quality and minimal degradation of the original audio source, such digital audio files are typically encoded and compressed in a file format, such as MPEG, audio layer 3 ("MP3"). Software stored on the user's computer (e.g., MP3 player) enables the user to play such downloaded digital audio data files by opening, decoding and decompressing the audio file at the user's computer.

In addition to downloading and storing such digital audio files to a user's computer over the Internet, it is also known to stream the audio data file to the user's computer from the multimedia server over the Internet without otherwise downloading or permanently storing the audio file in the user's computer. Streaming of the audio data file allows the user to decode, decompress and play the audio file almost immediately without waiting for the complete audio data file to first be downloaded to the user's computer.

In today's increasingly mobile society, it is desirable for a user to access and play high quality multimedia files using a portable device that can be carried by the user. Existing portable devices play MP3 audio data files that have previously been downloaded to the user's computer and then downloaded from the computer to the portable device over a cable connection (e.g., through a serial port on the computer). These existing devices utilize the user's computer as an intermediate connection between the portable device and the multimedia server to ultimately store MP3 audio files on the portable device. A disadvantage of such existing devices is that the user must select the particular audio files to be downloaded to the portable device, and arrange to download and store such files in the device prior to using the portable device. Furthermore, while advances have been made on the available memory in such portable devices, the number of audio files that can be downloaded and stored in the portable device continue to be limited by the memory associated with the device.

It would be advantageous to have a portable device capable of playing multimedia files, such as high quality, digital audio files, in real time without first having to download the preselected files from the user's computer for ultimate transfer and storage in the portable device prior to playing. It would also be advantageous for the user to access such files in the multimedia server without using the user's computer as an intermediate connection to the multimedia server. To avoid the entertainment industry's concerns over unauthorized reproduction of such copyrighted multimedia files, it would be desirable for the portable device to be capable of playing the multimedia file without storing the multimedia file in the device's memory for subsequent use.

SUMMARY OF THE INVENTION

The foregoing and other objects and advantages are achieved in accordance with the present invention through the provision of a portable device that receives and plays streamed multimedia files over a wireless network from a multimedia server.

In accordance with the present invention, a system, method and wireless device are provided for receiving and playing multimedia files streamed from a multimedia server over a wireless telecommunications network. A desired multimedia file is selected from one or more multimedia files stored in the multimedia server, which server is operatively connected to the wireless telecommunications network. Successive blocks of data from the desired multimedia file are streamed over the wireless telecommunications network in a digitized and compressed format and received by the wireless telecommunications device. The received blocks of data from the streamed multimedia file are temporarily stored in a buffer in the wireless device, decoded and decompressed, and successively played through an audio and/or video output in the wireless device.

In accordance with a preferred aspect of the present invention, the wireless device receives the blocks of data over the wireless telecommunications network at a first transmission rate until a minimum threshold level of data is stored in the buffer and at a second transmission rate after the minimum threshold level of data is stored in the buffer, the first transmission rate being higher than the second transmission rate when at least the minimum threshold level of data is stored in the buffer. A microprocessor in the wireless device monitors the size of the buffer to ensure that the data contained in the buffer does not fall below the minimum threshold level prior to receiving all of the blocks of data associated with the streamed multimedia file. If the size of the buffer falls beneath the minimum threshold level, the microprocessor signals the wireless telecommunications network to increase the rate that data is transmitted to the device over the wireless telecommunications network until the data contained in the buffer reaches or exceeds the minimum threshold level.

In a preferred embodiment of the invention, the user of the device may be billed for the use of the multimedia file prior to streaming the multimedia file to the wireless device. In another preferred embodiment, an authentication code is required to play multimedia files stored in a local memory of the wireless device, which code is transmitted to the wireless device upon receipt of payment information from the user of the device.

The foregoing specific objects and advantages of the invention are illustrative of those that can be achieved by the present invention and are not intended to be exhaustive or limiting of the possible advantages which can be realized. Thus, these and other objects and advantages of this invention will be apparent from the description herein or can be learned from practicing this invention, both as embodied herein or as modified in view of any variations which may be apparent to those skilled in the art. Accordingly, the present invention resides in the novel parts, constructions, arrangements, combinations and improvements herein shown and described.

BRIEF DESCRIPTION OF THE DRAWINGS

The foregoing features and other aspects of the invention are explained in the following description taken in connection with the accompanying drawings wherein.

DETAILED DESCRIPTION

The present invention provides a system, method and portable, wireless device for receiving, playing and storing streamed multimedia files over a wireless telecommunications network from a multimedia server. A preferred embodiment of the present invention is described below with reference to the drawings.

Figure 1:
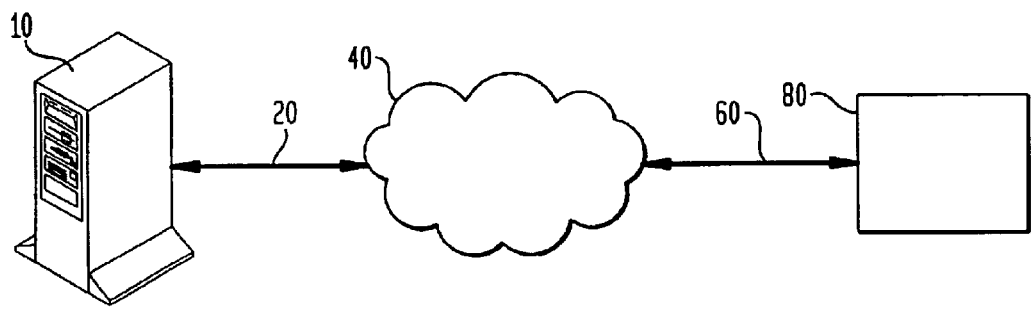
FIG. 1 is a block diagram of a wireless multimedia communications system in accordance with the present invention.

FIG. 1 is a block diagram illustrating a preferred wireless multimedia communications system in accordance with the present invention. A multimedia server 10 is connected to a telecommunications network 40 via communications link 20. High quality, digital multimedia files (e.g., audio, video, data, etc.) are stored within or otherwise accessible to the multimedia server 10. Preferably, the multimedia files are stored within the server 10 in an encoded and compressed file format, such as MP3. The multimedia server 20 may be a conventional third party server accessible over the Internet or a dedicated server maintained by the network provider.

While only one server 10 is illustrated in FIG. 1, it is understood that more than one multimedia server 10 may be utilized in accordance with the present invention. For instance, several multimedia servers 10 may be either linked to one another or otherwise connected to the telecommunications network 40 via one or more communications links 20.

The telecommunications network 40 may be a known wireless communications network or a combination of a wireless network interconnected with a conventional land-based telecommunications network, such as the Public Switched Telephone Network ("PSTN"). The wireless network is preferably a high bandwidth network capable of operating at speeds in excess of 144 kbps, such as a wideband Code Division Multiple Access ("CDMA") platform. Other known wireless platforms, such as the Universal Mobile Telecommunications System ("UMTS"), Local Multipoint Distribution System ("LMDS"), Global Systems for Mobile ("GSM") and even satellite-based systems (e.g., the Teledesic network), may be utilized as the wireless network in accordance with the present invention.

A portable wireless multimedia device 80, capable of decoding streamed, compressed data for playback to the user in real time, is connected to the network 40 over a wireless channel 60. As will be discussed below, the user of the wireless device 80 is able to access the multimedia server 10 over the network 40 to select one or more desired multimedia files stored or otherwise accessible to the server 10. The selected multimedia files are streamed to the wireless device 80 over link 20 through the network 40 and to the wireless device 80 over wireless channel 60. The streamed multimedia files are decoded, decompressed and played by the wireless device 80.

Figure 2:
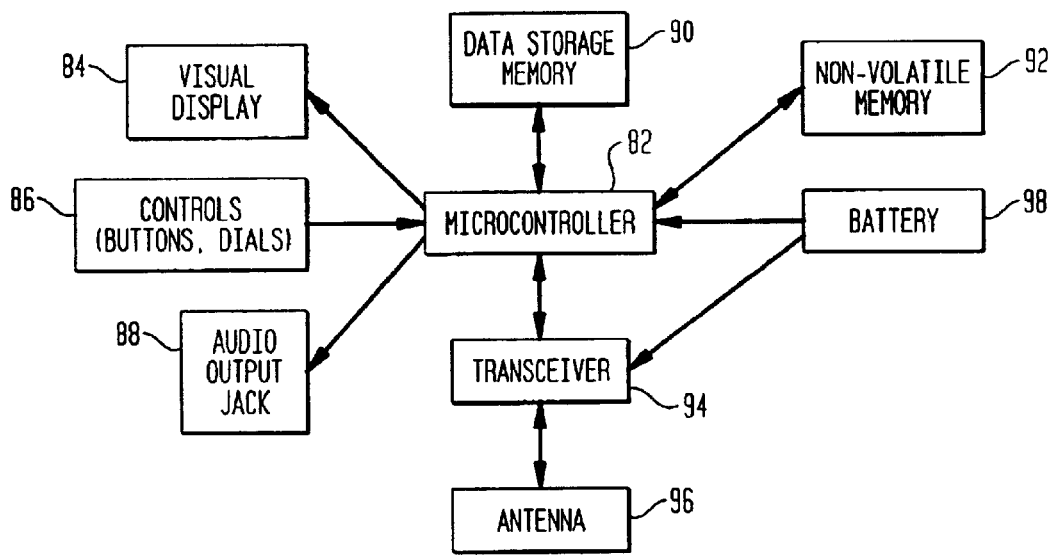
FIG. 2 is a block diagram of a portable device for receiving and playing multimedia files over a wireless network in accordance with the present invention.

A preferred embodiment of the wireless device 80 is illustrated in FIG. 2. The wireless device 80 includes a microprocessor or microcontroller 82 for controlling the operation of the wireless device 80.

The wireless device 80 also includes an antenna 96 and a transceiver 94 for transmitting or receiving information over wireless channel 60. The antenna 96 is connected to the transceiver 94 to facilitate transmission or reception of information/data over the wireless channel 60. Preferably, a conventional wideband transceiver and antenna are used in the wireless device 80. The transceiver 94 is connected to the microprocessor 82.

A battery 98, such as a conventional lightweight lithium-ion rechargeable battery, provides power to the wireless device 80. Preferably, the battery 98 is electrically connected to each of the various components of the wireless device 80 that require power, either directly or via the microprocessor 82. The microprocessor 82 may be configured to regulate the power consumption of the various components of the device 80.

The wireless device 80 also includes a data storage memory 90 and a non-volatile memory 92, each of which is connected to the microprocessor 82. The data storage memory 90 is the buffer used for streaming and/or the flash memory for storing the multimedia files in the wireless device 80. Multimedia files stored in the data storage memory 90 may be erased or recorded over. A conventional 8 Mbyte flash memory is suitable for use as the data storage memory 90. However, if the multimedia file is only being streamed and not stored in the device 80, then conventional 1, 2 or 4 Mbyte flash memory chips may be used as a buffer for streaming of multimedia files to the wireless device 80.

The non-volatile memory 92 serves as the ROM for the wireless device 80, permanently storing programmed information (e.g., software for decoding and decompressing the multimedia file) and data for running the microprocessor 82.

The wireless device 80 also includes a visual display 84, controls 86 and an audio output 88, each of which are connected to the microprocessor 82. The visual display 84 is used to display information to the user of the wireless device 80, such as playing a streamed video data file, displaying selections, operating the device 80, and providing feedback to the user regarding battery life and connection to the network 40. The display 84 may be a conventional LCD, touch display or LED display.

The controls 86 allow the user to operate the wireless device 80 and interface with the microprocessor 82. Various input controls (e.g., buttons, dials, soft keys, jog shuttles, etc.) may be used to allow the user to turn power to the device 80 on or off, to select desired multimedia files for streaming and/or downloading, to select user preferences for the device 80, or to scroll through different options.

The audio output 88 allows the user of the wireless device 80 to listen to a streamed or downloaded audio data file through one or more audio speakers (not shown) that may be incorporated into the wireless device 80 or otherwise connected through a conventional audio jack (e.g., headphones).

In operation, the user turns the power on to the wireless device 80 by selecting the appropriate input control 86. By selecting the appropriate input control 86, the user may view different songs, artists, genres, file names, etc. through the visual display 84. The user may also view a list of previous files (e.g., songs) and/or links that were previously accessed and stored in the data storage memory 90 of the device 80. Upon making a selection via the appropriate input control 86 and visual display 84, the user may access and listen to and/or view the selected multimedia file previously stored in the data storage memory 90 without establishing a connection to the network 40 over wireless channel 60.

In addition, upon making a selection via the appropriate input control 86 and visual display 84, the user may alternatively establish a connection to the appropriate, desired multimedia server 10 via the wireless channel 60, the network 40 and link 20. Alternatively, the user of the wireless device 80 may select an appropriate input control 86 on the device to establish a connection to a prime multimedia server 10 via the wireless channel 60, the network 40 and link 20, which prime media server 10 either stores multimedia files or a list of particular multimedia files and their respective address/location.

To connect the wireless device 80 to the multimedia server 10, the microprocessor 82 instructs the transceiver 94 to make a connection over the wireless network 40 to the multimedia server 10. As discussed above with respect to FIG. 1, this connection may be made using solely a wireless telecommunications network or a combination of a wireless telecommunications network with the PSTN, Internet and/or similar type of wired telecommunications network.

Once connected to the multimedia server 10, the user of the wireless device 80 may view a list of multimedia files (e.g., audio, video, data, etc.) or general categories of such multimedia files (e.g., by artist, genre, etc.) on the visual display 84 of the device 80, which list was communicated to the device 80 by the multimedia server 10 over link 20, network 40 and wireless channel 60. Preferably, the list was communicated by the server 10 to the network 40 in a TCP/IP packet format, which list would then be reformatted for transmission over the wireless network in a conventional manner. The reformatted list is received at the transceiver 94, processed by the microprocessor 82 and displayed on the visual display 84.

The user of the wireless device 80 selects the desired item(s) from the displayed list through use of the appropriate input control 86 and the microprocessor 82 instructs the transceiver 94 to transmit the selection to the multimedia server 10 over the wireless channel 60, network 40 and link 20.

Upon receipt of the desired selection, the multimedia server 10 then streams the selected multimedia files (e.g., digital MP3 audio files, video data files, etc.) back to the wireless device 80 over link 20, network 40 and wireless channel 60. The digital multimedia file is preferably transmitted in an encoded and compressed format, such as MP3, to the network 40 in TCP/IP packets, which are reformatted in a conventional manner for transmission over the wireless network and wireless channel 60 to the wireless device 80.

The wireless device 80 receives the transmitted multimedia file at the transceiver 94 and transfers the multimedia file to the microprocessor 82, which creates a temporary buffer in the data storage memory 90. The use of a buffer ensures that there is a continuous transmission of data so that the multimedia file (eg., digital MP3 audio file) sounds of high quality. Once an acceptable buffer is created, the microprocessor 82 converts the data temporarily stored in the buffer to a voltage signal suitable for audio/video output and sends that converted data from the buffer to the audio output 88 (for audio data files) and/or video display 84 (for video data files) for listening/viewing playback to the user of the wireless device 80.

In addition to streaming the multimedia file to the wireless device 80 from the multimedia server 10, the user may store the file in the data storage memory 90 (flash memory) of the device 80 for playback at a later time from a list of stored files displayed on the visual display 84 and selected through the use of the appropriate input controls 86.

To allow the wireless network provider to serve more subscribers and allow more users to access the system in accordance with the present invention, it is advantageous to conserve bandwidth within the wireless network 40. One way of accomplishing this is to preferably transmit data at the highest data rate possible over the wireless network 40 at the point in time when the data stream is initiated (e.g., the maximum bandwidth that the wireless network 40 can afford to allocate to a user and the maximum bandwidth the wireless device 80 can accept) to permit the microprocessor 82 of the device 80 to create approximately 5–10 seconds of buffer (which may take approximately 1 second). Once an acceptable buffer is created (e.g., approximately 5–10 seconds of buffer), the microprocessor 82 will instruct the transceiver 94 to signal the wireless network 40 to decrease the data transmission rate to the minimum rate necessary for adequate transmission—that is, fast enough so that the buffer does not fall below a minimum threshold level (e.g., 2–3 seconds of audio) and empty before receiving subsequent streamed data. If the buffer falls beneath this minimum threshold level, then the microprocessor 82 will instruct the transceiver 94 to signal the wireless network 40 to increase the data transmission rate until the minimum threshold level is satisfied, at which point in time the microprocessor 82 will then instruct the transceiver 94 to signal the wireless network 40 to decrease the data transmission rate to the maintain the minimum threshold level in the buffer until all the data is transmitted and the multimedia file (e.g., digital MP3 audio file) has ended.

It is understood that a Mobile Identification Number ("MIN") may be used to identify and locate the wireless device 80 within the wireless network 40. As discussed above, information may preferably be communicated over link 20 from the multimedia server 10 to the wireless network 40 in TCP/IP formatted packets addressed to the MIN assigned to the wireless device 80. The wireless network 40 preferably reformats the packets sent by the server 10 into an appropriate format for the wireless network 40. Because the wireless device 80 registers with the wireless network 40 in a conventional manner, the wireless network 40 identifies the approximate location of the wireless device 80 and transmits the reformatted data to the base station (not shown) within the wireless network 40 where the device 80 is currently registered. The reformatted data is then transmitted from the base station to the device 80 over wireless channel 60.

The present invention is particularly well-suited to address and alleviate the entertainment industry's concern over unauthorized copying, reproduction or distribution of copyrighted works contained in the multimedia files. To avoid this concern, the preferred embodiment of the present invention provides the ability to stream the multimedia file from the multimedia server 10 to the wireless device 80 over network 40 for temporary storage in a buffer in the data storage memory 90 of the device 80. In this manner, the streamed multimedia file may be played once in real time on the wireless device 80, rather than requiring the multimedia file to be stored in the device 80 for subsequent use. The user of the device 80 may be billed for each time the multimedia file is streamed to the device 80.

In a preferred embodiment of the invention, the user of the wireless device 80 may be billed prior to transmitting the multimedia file to the device. To start, a connection to a multimedia server 10 is established over the network 40 in a manner as discussed above. Then, a desired multimedia file is selected for listening and/or viewing by the user of the wireless device 80, also in a manner as discussed above. Next, a secure financial transaction is conducted by first determining the user's account (i.e., a cellular phone bill, credit card account, etc.), then debiting the account a specific amount for the use of the multimedia file, and finally confirming that the transaction has been approved. The specific details associated with this billing will be predetermined by the service provider, likely in a manner consistent with already established practices. Once the user of the wireless device 80 has been properly charged, the selected multimedia file is streamed to the wireless device 80 by the multimedia server 10 over the wireless network 40 in a manner as described above.

Alternatively, in another preferred embodiment, the multimedia server 10 may first transmit the multimedia file to the wireless device 80 over network 40 and store the file locally in memory 90 of the device 80. An authentication code to be sent by the multimedia server 10 over the wireless network 40 to the wireless device 80 would be required when the user desires to play the multimedia file on the device 80. One benefit of this approach is that the multimedia file only needs to be transmitted once for multiple playback, reducing airtime costs. Since the authentication code must be used to play the multimedia file on the wireless device 80, the ability to bill the user of the device 80 each time the multimedia file is played on the device 80 by the user is ensured.

More specifically, in this preferred embodiment of the invention, the user of the wireless device 80 is billed for the replay of multimedia files already received and stored at the device 80. In this case, the desired multimedia file is downloaded from the multimedia server 10 in a manner as discussed above and stored locally in memory 90 of the device 80. Once the user of the device 80 chooses to play (e.g., listen and/or view) the multimedia file, a connection is established between the wireless device 80 and the multimedia server 10 over the network 40 to authenticate the user and record the billing information in a manner predetermined by the provider of the service. Once completed, an authentication code is transmitted by the multimedia server 10 over the network 40 to the wireless device 80, which code is used as a key to allow the stored multimedia file to be played on the wireless device 80. Without the code, the stored multimedia file is unable to be played by the wireless device 80.

Although an illustrative preferred embodiment has been described herein in detail, it should be noted and will be appreciated by those skilled in the art that numerous variations may be made within the scope of this invention without departing from the principle of this invention and without sacrificing its chief advantages. The terms and expressions have been used herein as terms of description and not terms of limitation. There is no intention to use the terms or expressions to exclude any equivalents of features shown and described or portions thereof and this invention should be defined in accordance with the claims that follow.

We claim:

1. A device for receiving and playing a multimedia file streamed from a multimedia server over a wireless telecommunications network, comprising:

a microprocessor for controlling the operation of the device;

a transceiver operatively connected to the microprocessor for receiving successive blocks of data from the streamed multimedia file over the wireless telecommunication network, wherein blocks of data are received at an initial data transfer rate which is reduced upon receipt of a predetermined amount of data;

a buffer operatively connected to the microprocessor for temporarily storing the received blocks of data from the streamed multimedia file, wherein the temporarily stored blocks of data are processed without storing the received blocks of data in a long term memory medium; and an output operatively connected to the microprocessor for playing the processed successive blocks of data from the streamed multimedia file, wherein the processed, successive blocks of data are deleted by the device following playback.

2. The device according to claim 1, wherein the blocks of the multimedia file are received in a digitized and compressed format, transmitted at a first transmission rate until an initial threshold of blocks are received and subsequent blocks are transmitted at a second lower transmission rate.

3. The device according to claim 2, wherein the microprocessor is programmed to decode and decompress the blocks of data prior to playing through the output.

4. The device according to claim 3, further comprising a non-volatile memory operatively connected to the microprocessor for storing the decoding and decompression program, said memory is configured to store a program for transmitting a signal to a streaming device when a number of data blocks corresponding to a predetermined initial minimum threshold of data blocks have been received.

5. The device according to claim 4, further comprising a visual display operatively connected to the microprocessor for displaying a the name of the streamed multimedia file stored in the memory.

6. The device according to claim 1, further comprising a memory operatively connected to the microprocessor for storing the received blocks of data from the multimedia file for subsequent playback through the output.

7. The device according to claim 6, further comprising a user control panel operatively connected to a microprocessor to signal the microprocessor to play the blocks of data from the multimedia file that are stored in the memory.

8. The device according to claim 7, wherein the microprocessor is configured to establish a connection with the wireless telecommunication network and display a listing of at least one multimedia file server connected to the wireless telecommunication network on the visual display.

9. The device according to claim 8, wherein the displayed listing of at least one multimedia file server includes a remote multimedia file server and a file stored on said remote multimedia file server.

10. The device according to claim 8, wherein the displayed listing of at least one multimedia file server includes a central multimedia file server with links to at least one remote multimedia file server and a multimedia file stored on the remote multimedia file server.

11. The device according to claim 8, wherein the microprocessor is configured to receive a signal from the user control corresponding to a user selected displayed multimedia file server.

12. The device according to claim 8, wherein the microprocessor is configured to create a multimedia streaming file request transmitted to a connected multimedia file server.

13. The device according to claim 1, wherein the multimedia file is a digital audio file.

14. The device according to claim 1, wherein the multimedia file is a digital video file.

15. The device according to claim 1, wherein the output is an audio speaker.

16. The device according to claim 1, wherein the output is a receptacle for operatively connecting the device to an audio speaker.

17. The device according to claim 1, wherein the output is a visual display.

18. The device according to claim 1, wherein the blocks of data are received from the wireless telecommunications network at a first transmission rate until a minimum threshold level of data is stored in the buffer and at a second transmission rate after the minimum threshold level of data is stored in the buffer, wherein the first transmission rate is higher than the second transmission rate when the minimum threshold level of data is stored in the buffer.

19. The device according to claim 18, wherein the microprocessor monitors the size of the buffer to ensure that the data contained in the buffer does not fall below the minimum threshold level prior to receiving all of the blocks of data associated with the multimedia file.

20. The device according to claim 19, wherein the microprocessor signals the wireless telecommunications network to adjust the data transmission rate that data to the device based upon the size of the buffer.

21. The device according to claim 19, wherein the microprocessor signals the wireless telecommunications network to increase the data transmission rate to the device when the size of the buffer falls beneath the minimum threshold level.

22. The device according to claim 1, wherein the device is portable and comprises a battery for powering the device.

23. The device according to claim 1, wherein the device is adapted to transmit payment information over the wireless network to the multimedia server before the multimedia file is streamed to the device.

24. The device according to claim 1, wherein a user of the device is billed each time a multimedia file is streamed to the device.

25. The device according to the claim 1, wherein the transceiver is a wideband transceiver operatively connected to an antenna and the microprocessor.

26. The device according to claim 1, wherein the microprocessor is configured to manage power consumption of device components.

27. A system for streaming a multimedia file over a wireless telecommunications network to a wireless device, comprising:
- a multimedia server operatively connected to the wireless telecommunications network, the multimedia server including a database for storing the multimedia file and adapted to stream successive blocks of data from the multimedia file over the wireless telecommunications network in a digitized and compressed format; and
- a wireless device operatively connected to the wireless telecommunications network for receiving and playing the streamed multimedia file, the wireless device comprising:
  - a microprocessor for controlling the operation of the wireless device;
  - a transceiver operatively connected to the microprocessor for receiving the successive blocks of data streamed over the wireless telecommunications network, wherein blocks of data are received at an initial data transfer rate which is reduces upon receipt of a predetermined amount of data;
  - a buffer operatively connected to the microprocessor for temporarily storing the received blocks of data from the streamed multimedia file, wherein the temporarily stored blocks of data are processed without storing the received blocks of data in a long term memory medium; and
  - an output operatively connected to the microprocessor for playing the successive blocks of data from the streamed multimedia file, wherein the microprocessor is programmed to decode and decompress the blocks of data prior to playing through the output, and the decoded and decompressed blocks of data are deleted by the device following playback.

28. The system according to claim 27, wherein the wireless device further comprises a non-volatile memory operatively connected to the microprocessor for storing the decoding and decompression program, said memory is configured to store a program for transmitting a signal to a streaming device when a number of data blocks corresponding to a predetermined initial minimum threshold of data blocks have been received.

29. The system according to claim 27, wherein the wireless device further comprises a memory operatively connected to the microprocessor for storing the received blocks of data from the multimedia file for subsequent playback through the output.

30. The system according to claim 29, wherein the wireless device further comprises a visual display operatively connected to the microprocessor for displaying the name of the streamed multimedia file stored in the memory.

31. The system according to claim 29, wherein the wireless device further comprises a user control panel operatively connected to the microprocessor to signal the microprocessor to play the blocks of data from the multimedia file that are stored in the memory.

32. The system according to claim 29, wherein an authentication code must be received by the wireless device prior to playback of the received blocks of data from the multimedia file stored in the memory.

33. The system according to claim 32, wherein the authentication code is transmitted by the multimedia server over the wireless network to the wireless device.

34. The system according to claim 27, wherein the multimedia file is a digital audio file.

35. The system according to claim 27, wherein the multimedia file is a digital video file.

36. The system according to claim 27, wherein the output is an audio speaker.

37. The system according to claim 27, wherein the output is a receptacle for operatively connecting the device to an audio speaker.

38. The system according to claim 27, wherein the output is a visual display.

39. The system according to claim 27, wherein the blocks of data are received from the wireless telecommunications network at a first transmission rate until a minimum threshold level of data is stored in the buffer and at a second transmission rate after the minimum threshold level of data is stored in the buffer, the first transmission rate being higher than the second transmission rate when at least the minimum threshold level of data is stored in the buffer.

40. The system according to claim 39, wherein the microprocessor monitors the size of the buffer to ensure that data contained in the buffer does not fall below a minimum threshold level prior to receiving all of the blocks of data associated with the multimedia file.

41. The system according to claim 40, wherein the microprocessor signals the wireless telecommunications network to adjust the rate that data is transmitted to the wireless device based upon the size of the buffer.

42. The system according to claim 40, wherein the microprocessor signals the wireless telecommunications network to increase the rate that data is transmitted to the wireless device when the size of the buffer falls beneath the minimum threshold level.

43. The system according to claim 27, wherein the wireless device is portable and comprises a battery for powering the device.

44. The system according to claim 27, wherein the multimedia server is operatively connected to the wireless telecommunications network via the public switched telephone network.

45. The system according to claim 27, wherein the multimedia server is operatively connected to the wireless telecommunications network via the Internet.

46. The system according to claim 27, wherein payment information is communicated to the multimedia server prior to streaming the multimedia file to the wireless device.

47. The system according to claim 27, wherein a user of the device is billed each time a multimedia file is streamed to the device.

48. A method for operating a wireless device for receiving data over a wireless network, comprising:
   transmitting a message identifying a selected multimedia file;
   receiving successive blocks of data from the selected multimedia file, wherein the successive blocks of data are received at an initial data transfer rate which is reduced upon receipt of a predetermined amount of data;
   temporarily storing the received blocks of data in a buffer;
   decoding and decompressing the blocks of data;
   successively playing the decoded and decompressed blocks of data through an output in the wireless device.

49. The method according to claim 48, wherein the blocks of data are received at a first transmission rate until a minimum threshold level of data is stored in the buffer and at a second transmission rate after the minimum threshold level of data is stored in the buffer, the first transmission rate being higher than the second transmission rate when at least the minimum threshold level of data is stored in the buffer.

50. The method according to claim 49, further comprising monitoring the size of the buffer to ensure that the data contained in the buffer does not fall below the minimum threshold level prior to receiving all of the data associated with the selected multimedia file.

51. The method according to claim 48, further comprising requesting a subsequent adjustment of the rate that data is transmitted based upon the amount of data in the buffer.

52. The method according to claim 48, further comprising the step of requesting an increase of the rate that data is transmitted when the amount of data in the buffer falls beneath the minimum threshold level.

53. The method according to claim 48, further comprising the step of storing the received blocks of data in a memory of the wireless device for subsequent playback through the output.

54. The method according to claim 53, further comprising displaying the name of the selected multimedia file stored in the memory and playing the multimedia file through the output.

55. The method according to claim 53, further comprising the step of receiving an authentication code prior to playback of the received blocks of data stored in the memory.

56. The method according to claim 55, wherein the authentication code is received after a transmission of payment information from the device.

57. The method according to claim 55, wherein the authentication code is received by the wireless device over the wireless network.

58. The method according to claim 57, wherein, prior to the wireless device receiving the authentication code, an account associated with a user of the device is identified and debited.

59. The method according to claim 48, wherein the multimedia file is a digital audio file.

60. The method according to claim 48, wherein the multimedia file is a digital video file.

61. The method according to claim 48, wherein the output is an audio speaker.

62. A The method according to claim 48, wherein the output is a receptacle for operatively connecting the device to an audio speaker.

63. The method according to claim 48, wherein the output is a visual display.

64. The method according to claim 48, further comprising selecting a multimedia file from a multimedia server operatively connected to the wireless telecommunications network via the public switched telephone network.

65. The method according to claim 48, further comprising selecting a multimedia file from a multimedia server operatively connected to the wireless telecommunications network via the Internet.

66. The method according to claim 48, further comprising transmitting payment information before the selected multimedia file is received by the wireless device.

67. The method according to claim 48, further comprising the step of receiving a billing indication prior to receipt of the selected multimedia file.

68. The method according to claim 67, further comprising the steps of:
   transmitting data associated with a device user account; and
   receiving an indication that the device user account has been debited a predetermined amount.

69. The method according to claim 48, further comprising receiving a listing of available multimedia files for the wireless device.

* * * * *